(12) United States Patent
Petrovic et al.

(10) Patent No.: US 11,133,730 B2
(45) Date of Patent: Sep. 28, 2021

(54) COMMUNICATION DEVICE (71) Applicant: Würth Elektronik eiSos GmbH & Co. KG, Waldenburg (DE)

(72) Inventors: Tomislav Petrovic, Nis (RS); Dragan Dinulovic, Munich (DE)

(73) Assignee: WÜRTH ELEKTRONIK EISOS GMBH & CO. KG, Waldenburg (DE)

( * ) Notice: Subject to any disclaimer, the term of this patent is extended or adjusted under 35 U.S.C. 154(b) by 1079 days.

(21) Appl. No.: 15/517,834

(22) PCT Filed: Aug. 7, 2015

(86) PCT No.: PCT/EP2015/068248
§ 371 (c)(1),
(2) Date: Apr. 7, 2017

(87) PCT Pub. No.: WO2016/058725
PCT Pub. Date: Apr. 21, 2016

(65) Prior Publication Data
US 2017/0310195 A1 Oct. 26, 2017

(30) Foreign Application Priority Data
Oct. 15, 2014 (DE) .................. 10 2014 220 847.5

(51) Int. Cl.
*H02K 7/18* (2006.01)
*H02K 11/30* (2016.01)
(Continued)

(52) U.S. Cl.
CPC ........... *H02K 7/1853* (2013.01); *H02K 1/265* (2013.01); *H02K 7/025* (2013.01); *H02K 7/1846* (2013.01);
(Continued)

(58) Field of Classification Search
CPC ...... H02K 7/1853; H02K 11/30; H02K 1/265; H02K 7/025; H02K 7/1846; H02K 7/1166;
(Continued)

(56) References Cited

U.S. PATENT DOCUMENTS 5,844,516 A 12/1998 Viljanen
7,638,889 B2 12/2009 Yeh
(Continued)

FOREIGN PATENT DOCUMENTS

CN 203858722 10/2014
DE 299 18 342 U1 1/2000
(Continued)

OTHER PUBLICATIONS

Texas Instruments, TPS728xx Series, Aug. 2007, pp. 1-3 (Year: 2007).*
(Continued)

*Primary Examiner* — Brian Wilson
(74) *Attorney, Agent, or Firm* — Boyle Fredrickson, S.C.

(57) ABSTRACT

A communication device includes a device for mechanically generating a rotational movement that includes a drive rod and a pushbutton for generating a linear movement of the drive rod and at least one gear wheel which, in the event of a linear movement of the drive rod, is set in rotational motion. The device further includes a converter module connected to the movement module that converts the rotational movement into electrical energy, an energy management module connected to the converter module that the electrical energy in line with prespecified boundary conditions, and a transmission module for transmitting information.

7 Claims, 5 Drawing Sheets (51) Int. Cl.
*H02K 1/26* (2006.01)
*H02K 7/02* (2006.01)
*H04W 52/02* (2009.01)

(52) U.S. Cl.
CPC ......... *H02K 11/30* (2016.01); *H04W 52/0296* (2013.01); *Y02D 30/70* (2020.08)

(58) Field of Classification Search
CPC ...... H02K 7/183; H02K 2201/03; H02K 7/06; H02K 7/116; H02K 7/18; H02K 7/1807; H02K 7/1869; Y02D 70/162; Y02D 30/70; H04W 52/0296
See application file for complete search history.

(56) References Cited

U.S. PATENT DOCUMENTS

| | | | |
|---|---|---|---|
| 8,653,703 | B2 | 2/2014 | Kori et al. |
| 8,794,807 | B2 | 8/2014 | Koo |
| 9,973,046 | B2 | 5/2018 | Dinulovic et al. |
| 2003/0080938 | A1* | 5/2003 | Lian ............... G06F 1/26 345/156 |
| 2004/0046462 | A1* | 3/2004 | Chen ............... H02K 7/1853 310/20 |
| 2005/0194852 | A1 | 9/2005 | Liao |
| 2006/0158485 | A1* | 7/2006 | Hill ............... B41J 2/04548 347/57 |
| 2007/0096469 | A1 | 5/2007 | Yeh |
| 2009/0022939 | A1 | 1/2009 | Yanagida et al. |

FOREIGN PATENT DOCUMENTS

| | | |
|---|---|---|
| DE | 100 46 593 A1 | 4/2002 |
| DE | 10 2009 041 023 A1 | 3/2011 |
| GB | 110 700 A | 11/1917 |
| JP | 5448016 | 4/1979 |
| JP | 1988153759 | 11/1988 |
| JP | 1990029345 | 3/1990 |
| JP | 8007160 | 3/1996 |
| JP | 2002084726 | 3/2002 |
| JP | 2002201692 | 7/2002 |
| JP | 2014169687 | 9/2014 |
| KR | 20-0392626 | 8/2005 |
| KR | 1020120101774 | 9/2012 |
| RU | 2130228 C1 | 5/1999 |
| WO | WO-9606282 A2 * | 2/1996 ............... F03G 3/00 |

OTHER PUBLICATIONS

English translation of Japanese Office Action dated Jan. 25, 2019.
A Russian Search Report dated May 30, 2018.
English Translated Japanese Office Action, dated May 29, 2018, 5 pages.
Japanese Office Action, 3 pages.
English translation of Indian Office Action dated Nov. 30, 2019.

* cited by examiner

COMMUNICATION DEVICE

FIELD OF THE INVENTION

The invention relates to a communication device and to a power supply module for a communication device.

BACKGROUND

German laid-open specification DE 10046593 A1 discloses a communication arrangement which is to be attached to a mobile device and transmits measurement data with the aid of a transmitter. The arrangement contains an energy store in the form of a battery. An energy converter with a wind wheel and a generator serves to charge the battery.

German laid-open specification DE 102009041023A1 discloses an electrodynamic energy converter which contains an oscillator which is spring-mounted in a housing and has permanent magnets and moves in relation to a coil. This energy converter draws its mechanical energy from oscillations.

SUMMARY

The invention is based on the object of providing a wireless communication device and a power supply module which can be adapted to an extremely wide variety of applications and environments with a low level of expenditure.

In order to achieve this object, the invention proposes a communication device having the features cited in claim 1 and a power supply module having the features of claim 11. Developments of the invention are the subject matter of dependent claims.

According to the invention, a communication device is constructed from at least four constituent parts which are assembled in a modular manner. A first module converts movement energy into electrical energy and will be referred to as converter module. A second module is an energy management module which, for example, stores, transforms and/or converts the electrical energy which is provided by the converter module, in order to be able to provide electrical energy in line with prespecified boundary conditions. A third module is a transmission module which uses the electrical energy for its own operation and emits a communication signal, for example a measurement value signal. A fourth module mechanically generates a rotational movement and will be referred to as movement module. According to the invention, the movement module has a drive rod and at least one gear wheel which acts on the drive rod and, in the event of a linear movement of the drive rod, is set in rotational motion. Owing to the modular construction from four constituent parts which can each be individually replaced, it is possible, depending on the application, to select a module which is particularly suitable for said application and to use said module in the communication device.

It is possible for the modules of the communication device to be individually replaced by modules with other characteristics, but preferably of the same physical size or a compatible physical size.

It can be provided that, in the case of the communication device which is proposed by the invention, at least one preferably mechanically self-contained module is selected from amongst a large number of modules of the same functionality and the same or a compatible physical size.

It can be provided that the at least one module is realized as a mechanically separate structural element which is formed in such a way that it can be mechanically and functionally coupled to the associated adjacent module.

Depending on the components used, it can be provided that the energy management module or the transmission module has a power matching means. This power matching means is intended to serve to match the electrical energy which is supplied by the energy converter to the requirements of the electronics system of the transmission module and, if necessary, also to the requirements of an active sensor.

Communication devices of the kind under consideration here can be used as transmitters of measurement values. If the value to be measured does not directly generate the rotational movement, the transmission module can therefore have a possible connection for a measurement value sensor in a development. Expediently, the power matching means is in this case also responsible for this sensor if said sensor is a sensor which also requires electrical power in order to operate.

In a development of the invention, the drive rod, at least in sections, is in the form of a worm shaft.

Reliable transmission of force to the gear wheel can be achieved by means of a worm shaft. The worm gear mechanism, which is formed by the worm shaft and the gear wheel which is in the form of a worm gear in particular, is operated by means of a linear drive movement of the worm. The drive rod is therefore moved in a linear manner and the worm shaft, by virtue of its translatory movement, sets the gear wheel in rotation. It goes without saying that, as an alternative, rotation of the drive rod about its longitudinal axis is also possible. Therefore, two different transmission ratios can be realized by the worm gear mechanism if required, one by rotation of the drive rod with a resulting slow rotation of the gear wheel, and one by linear translatory movement of the drive rod with a resulting quicker rotation of the gear wheel. Worm shafts and worm gears are available as standard parts and can be manufactured, for example, by machining.

In a development of the invention, the drive rod, at least in sections, is provided with a screw thread. In a case of this kind, the gear wheel can be designed either with a spur toothing system or with a helical toothing system. As a kinematic pairing, a screw with a screw thread and a gear wheel with a helical toothing system have better properties than the pairing comprising a screw thread and a gear wheel with a spur toothing system. However, manufacture of a gear wheel with a spur toothing system is significantly more cost-effective, for example by means of injection molding or sintering technology. However, a coupling between the screw thread and the gear wheel, even with a spur toothing system, can be adjusted, so that satisfactory interaction between the screw thread and the gear wheel can be realized, even if the gear wheel has a spur toothing system. Screw threads can be produced in a highly cost-effective manner and are available as standard parts in any case.

In a development of the invention, the drive rod, at least in sections, is provided with a toothing system in the form of circularly circumferential teeth and adjacent circumferential recesses. In this way, a round toothed rack is formed, in which the teeth therefore do not run in a linear manner, as in the case of a conventional toothed rack, but rather is formed by circular raised portions and recesses which alternate with one another in the longitudinal direction of the drive rod. As seen in cross section, the successive projections and recesses form a conventional toothing system profile in this case, A round toothed rack of this kind can interact with a gear wheel having a spur toothing system in this case. A toothing system in the form of circularly circumferential teeth and adjacent circumferential recesses on the drive rod can be produced, in this case, in a particularly simple and favorable manner, for example by means of turning. Since there are no undercuts, a toothing system of this kind can also be produced by means of injection molding. A spur-toothed gear wheel can likewise be produced by means of injection-molding technology or else sintering technology. The kinematic pairing between this so-called round toothed rack and a gear wheel with a spur toothing system is correct in this case and the contact between the gear wheel and the toothing system of the round toothed rack takes place at one point. Since only small forces have to be transmitted in the case of the communication device according to the invention, this is to be seen as positive. With the contact at one point, the system is not overdetermined in relation to the statics. Therefore, faults and/or tolerances during manufacture do not influence the functionality.

In a further refinement, of the invention, a spring can be provided in order to prestress the pushbutton and/or the drive rod in a starting position. By way of example, changes in the state of devices, for example opening or closing of a hatch, can be checked with a pushbutton of this kind. The energy of the spring can likewise be used for generating a rotational movement of the gear wheel by the spring pushing the drive rod back to the starting position after operation of the pushbutton.

In a development, the device for generating a rotational movement can also have a gear mechanism with a step-up ratio or else a step-down ratio.

Particularly in the case of a pushbutton for generating the rotational movement, it can be provided that, this device has a freewheel with a non-return device, so that a longer-lasting rotational movement can be generated by operating the pushbutton several times.

It can be provided that the converter module has a rotor comprising at least one permanent magnet and has a stator which is separated from the rotor by an air gap and comprises at least one coil.

The electrical power which is supplied by the converter module can be varied within wide limits owing to the number and design of the permanent magnets and the number and design of the coils.

By way of example, the rotor can have permanent magnets of alternating polarity, and the number and size of the coils of the stator can be equal to the number and size of the permanent magnets.

The at least one coil can be mounted on a printed circuit board. The printed circuit board can be provided with an insertion slot for the energy management module and/or the transmission module.

It can be provided that the structural component which is mechanically set in rotational motion is the rotor of the converter module.

The energy management module can have a printed circuit board on which the converter module is arranged and which has an insertion slot for the transmission module.

A communication device, as has been described in this document, can be used as a signal transmitter. Therefore, operation, for example, of the pushbutton already constitutes the signal which is intended to be wirelessly transmitted. Even in the case of the rotational movement being generated by a turbine or a wind wheel, the rotation itself can be the signal, for example if the presence of a flow movement is intended to be checked.

A communication device, as has been described in this document, can be used to transmit sensor measurement values. In this case, the rotational movement, which is generated mechanically, serves only to supply power to the transmission module and, if necessary, the sensor.

The invention further proposes a power supply module for a communication device which contains a device, which is in the form of a movement module, for mechanically generating a rotational movement and contains a converter module for converting the rotation energy of the rotational movement into electrical energy.

The converter module can have a rotor comprising at least one permanent magnet and a stator which is separated from the rotor by an air gap and comprises at least one coil, preferably a large number of coils.

On account of the modular construction and the converter module which is proposed by the invention and allows high energy densities, the communication device has wide and varied fields of application.

Further features, details and advantages of the invention are set forth in the claims and the abstract, the wording of both of which is included in the description by reference, the following description of preferred embodiments of the invention and on the basis of the drawing. Individual features of the various illustrated embodiments can in this case be combined with one another in any desired manner without going beyond the scope of the invention. In the drawing:

DETAILED DESCRIPTION

Figure 1:
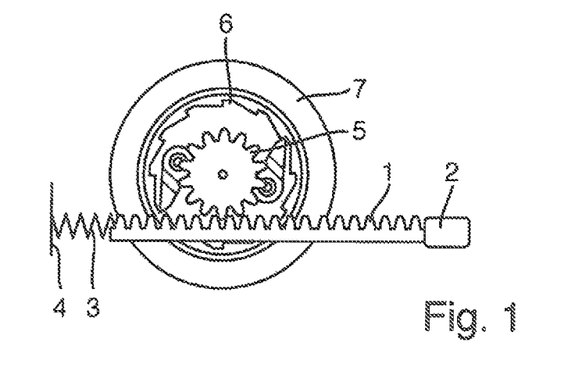
FIG. 1 schematically shows a device for generating a rotational movement with the aid of a pushbutton.

FIG. 1 schematically describes the device for generating a rotational movement. The device contains a toothed rack 1 which is displaceably mounted in the module. The toothed rack 1 contains, at its free end, a pushbutton 2. Said pushbutton is moved to the illustrated position by a compression spring 3 which is supported on a housing wall 4. The toothed rack 1 engages, by way of its row of teeth, with a gear wheel 5. The gear wheel 5 is connected to a disk 7 by means of an indicated freewheel 6. When the toothed rack 1 is displaced with the aid of the pushbutton 2, to the left in FIG. 1, the disk 7 is set in rotation by means of the gear wheel 5. If the pushbutton 2 is released, the toothed rack 1 returns to the illustrated position. In the process, the disk 7 is decoupled from the toothed rack 1 with the aid of the freewheel. In this way, it is possible to generate a longer-lasting rotational movement of the disk 7 by pressing said pushbutton several times.

Figure 2:
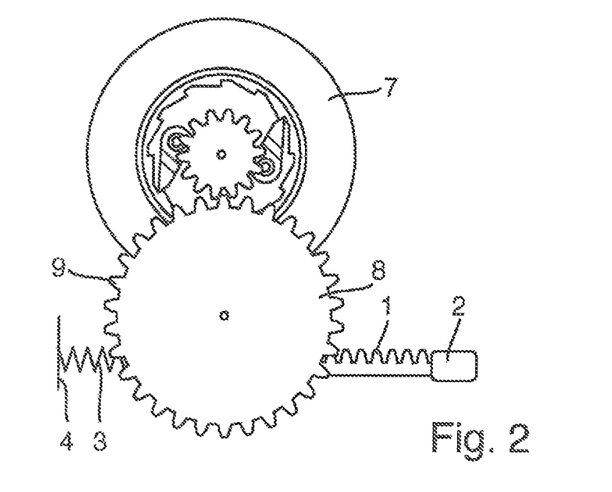
FIG. 2 is an illustration which corresponds to FIG. 1 with a step-up gear mechanism.

In the embodiment illustrated in FIG. 2, the toothed rack 1 engages with a gear wheel 8 which is connected to a larger gear wheel 9 in a rotationally fixed manner. This larger gear wheel 9 then engages with the gear wheel 5 of the preceding embodiment. A step-up gear mechanism is formed by the interposition of the two gear wheels 8, 9, so that the disk 7 is set in quicker rotation with the same travel of the toothed rack 1.

Figure 3:
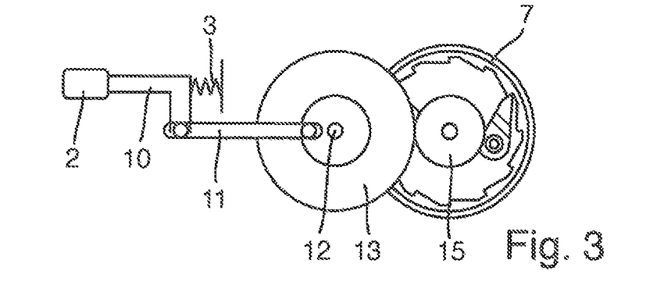
FIG. 3 likewise schematically shows a device for generating a rotational movement with the aid of a crank drive.

In the embodiment illustrated in FIG. 3, a pushbutton 2 is again provided, said pushbutton being displaceably guided in the module and being moved to a starting position with the aid of a compression spring 3. The angled end of the rack 10, which has the pushbutton 2, is connected to a gear 12 by means of a connecting rod 11, wherein the connecting rod 11 is eccentrically connected in an articulated manner to the gear 12. The gear 12 is connected to a larger gear 13 in a rotationally fixed manner, the circumference of said larger gear engaging with a gear 15 which corresponds to the gear wheel 5. The illustrated example involves frictional engagement between the gears 13 and 15. In addition, the rotation of the gear 15 by means of a freewheel again leads to rotation of the disk 7. The embodiment illustrated in FIG. 3 therefore constitutes a crank drive for the disk 7.

Figure 4:
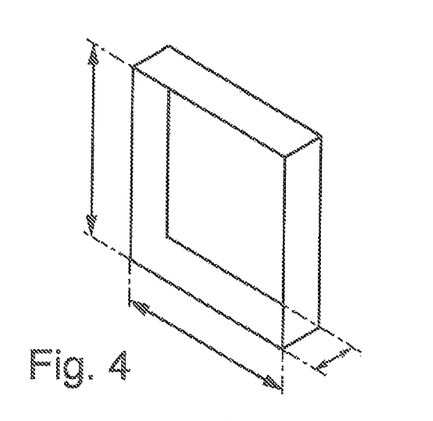
FIG. 4 shows the geometric shape of a communication device.

FIG. 4 schematically shows the size and the geometric shape of the communication device according to one exemplary embodiment of the invention. The communication device which consists of the three parts is intended to be accommodated in a cuboidal box, as indicated in FIG. 4. The thickness of the cuboidal box is intended to lie in the range of approximately 10-20 mm, and the edge lengths of the two other dimensions are intended to lie approximately in the region of 50 mm.

Figure 5:
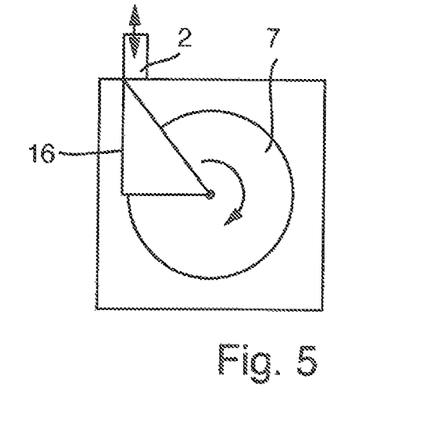
FIG. 5 schematically shows the construction of a communication device from the three modules.

FIG. 5 then shows a side view of a communication device of this kind. The pushbutton 2 protrudes out of one side of the cuboidal box. The travel of the button is approximately 2-10 mm. The button 2 sets the disk 7 in rotation by means of a mechanism 16.

Figure 6:
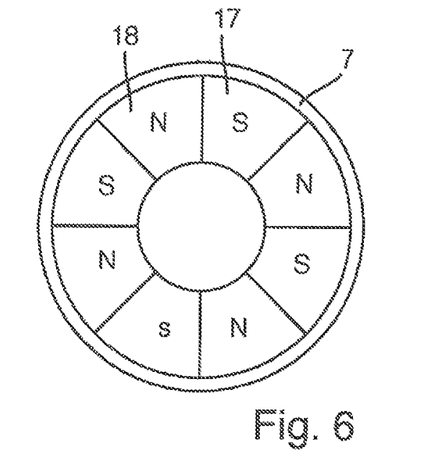
FIG. 6 shows the end view of the rotor of a converter module of the communication device according to the invention.

FIG. 6 then shows an end view of a portion of the converter module, that is to say the module which converts the rotational movement, which is generated by the first module, of the disk 7 into electrical energy. Said part is the rotor in FIG. 6. The disk 7 forms the yoke of the rotor of the converter module. Said disk is composed of soft-magnetic material. Permanent magnets 17, 18, of which the poles have directions which alternately differ in orientation, are fastened on said disk. There are eight permanent magnets in the illustrated example. Said permanent magnets are in the form of a sector of a circle in the plan view of FIG. 6.

Figure 7:
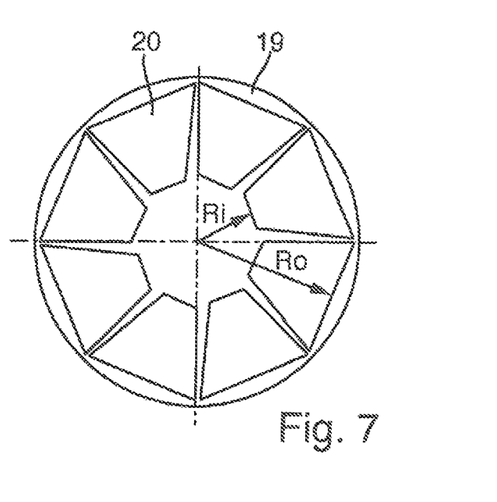
FIG. 7 shows the end view of the stator of the converter module.

The converter module contains a stator which interacts with the rotor of FIG. 6 and is illustrated in an end view in FIG. 7. The stator contains eight coils 20, which are each wound around a core which is composed of magnetic material, on a yoke 19 which is composed of soft-magnetic material. The number and the size of the coils 20 corresponds to the number and size of the permanent magnets 17, 18 which are fitted on the stator 7.

Figure 8:
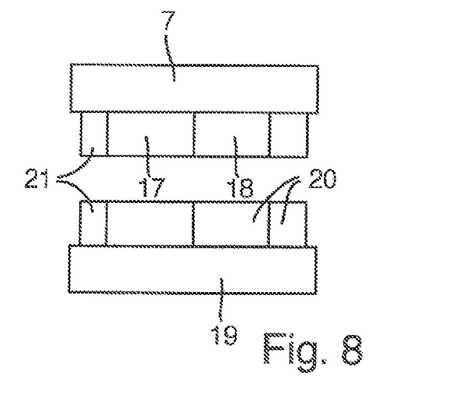
FIG. 8 shows a simplified side view of the converter module of the communication device of the invention.

FIG. 8 shows a side view of the arrangement comprising the rotor of FIG. 6 and the stator of FIG. 7. The sides shown in FIG. 6 and FIG. 7 lie opposite one another, and an air gap 21 is formed between the two parts.

The voltage which is supplied by the converter module depends on the rotation speed, the number of permanent magnets and coils, the number of windings of the coils, the material used, the size of the air gap and, of course, the overall size of the arrangement.

Figure 9:
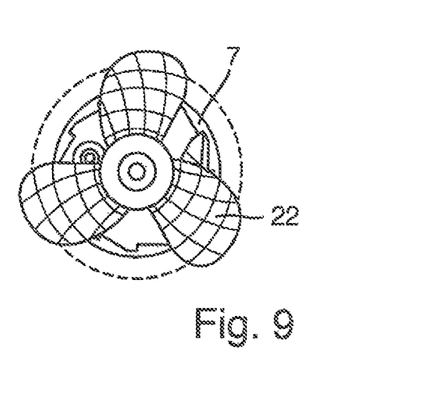
FIG. 9 is an illustration which corresponds to FIGS. 1-3 of a module for generating a rotational movement.

FIG. 9 then shows a further example for generating the rotational movement. In said figure, a wind wheel 22 is connected to the rotor 7, a three-blade wind wheel in the illustrated example. This wind wheel 22 serves as an example of a turbine. It goes without saying that other forms of turbine and wind wheel are also possible. This manner of generating the rotational movement is suitable, for example, for environments in which wind is always present.

However, an arrangement as is illustrated in FIG. 9 can also serve to indicate the presence of a flow of air or a flow of liquid.

Figure 10:
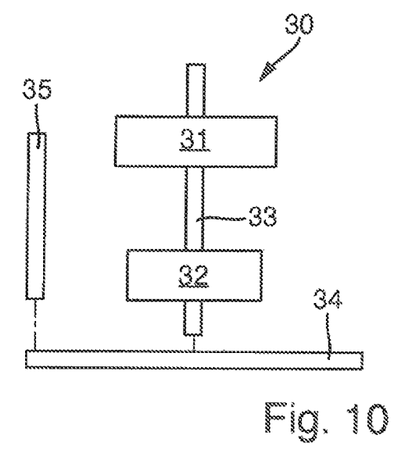
FIG. 10 is a schematic exploded illustration of a communication device according to the invention in line with a further embodiment.

The illustration of FIG. 10 schematically shows a communication device 30 according to the invention which has a movement module 31 and a converter module 32, wherein the movement module 31 and the converter module 32 are arranged on a common axle 33. A rotational movement about the axle 33 is generated by the movement module 31, said rotational movement then being converted into electrical energy by the converter module 32. The axle 33 is intended to be mounted on a printed circuit board of a power management module 34. In the illustration of FIG. 10, the axle 33 is illustrated in a manner lifted away from the power management module 34 and a dashed line is intended to indicate the intended connection of the axle 33 and the power management module 34.

The electrical energy which is supplied by the converter module 32 is converted in line with prespecified boundary conditions in the power management module 34. The electrical voltage which is supplied by the converter module 32 is, for example, stepped up and adjusted in the energy management module 34. An AC voltage which is induced by means of a rotating rotor comprising permanent magnets and coils which are stationary in relation to the rotating permanent magnets is supplied by the converter module 32. This AC voltage is first stepped up to a value of a few volts by means of a transformer in the energy management module 34. The voltage is then rectified and adjusted to a desired value by means of a DC/PC converter. The AC voltage which is supplied by the converter module 32 can be stepped up, for example, by a factor of 100. An adjusted DC voltage with a value of, for example, 1.8 volts or 3.3 volts is supplied as output voltage of the energy management module 34 and then provided to a transmission module 35.

The transmission module 35 can then transmit an item of information, for example a measurement value signal. The signal can then be sent, for example, to a central station or to a suitable controller, for example a motor controller. The transmission module 35 is intended to be inserted into an insertion slot, not illustrated in FIG. 10, in the printed circuit board of the energy management module 34. This is indicated in FIG. 10 by means of a dashed line between the transmission module 35 and the energy management module 34.

Figure 11:
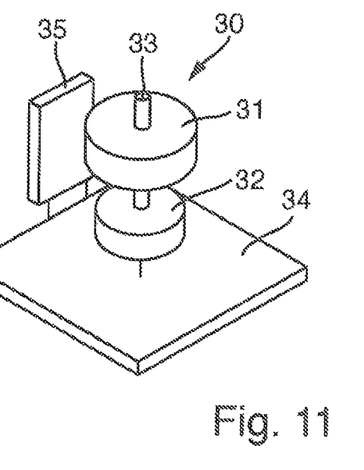
FIG. 11 shows a view of the communication device of FIG. 10 obliquely from above.

FIG. 11 shows a view of the communication device 30 of FIG. 10 obliquely from above. The compact construction of the communication device 30 is shown. A considerable advantage of the modular construction is that the individual modules 31, 32, 34 and 35 can not only be exchanged for modules with other properties, but rather that primarily commercially available modules can be used. By way of example, a market-ready system, for example MSP430 from Texas Instruments, LTC31xx or LTC35XX from Linear Technology, can be used as energy management module 34. Commercially available systems, for example Semtech SX1230 or transmission modules ZIGBEE, can be used as the transmission module too. The transmission modules can send, for example, signals with a frequency of 315 MHz, 434 MHz, 868 MHz or 915 MHz. The range of systems of this kind is typically up to 100 m. The transmitted signal can be a statement about the movement energy which Is generated at the movement module 31, for example when the movement module 31 has a turbine and a statement is intended to be made about a flow rate. However, a sensor, of which the signal is then transmitted by means of the transmission module 35, can also be connected to the transmission module 35 or to the energy management module 34.

Figure 12:
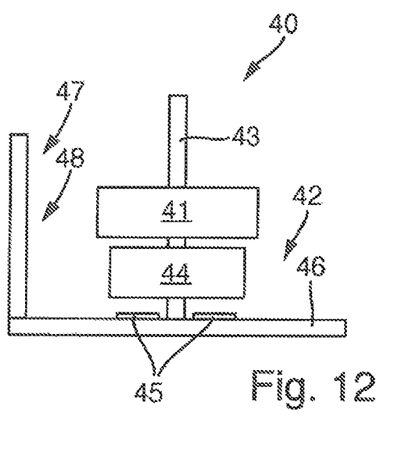
FIG. 12 is a schematic side view of a communication device according to the invention in line with a further embodiment.

The illustration of FIG. 12 shows a schematic side view of a further communication device 40 according to the invention. A movement module 41 and a converter module 42 are arranged on a common axle 43. The movement module 41 generates a rotation energy which is then converted into electrical energy by the converter module 42. In the illustrated embodiment, the converter module 42 has a rotor 44 which rotates on the axle 43 and has a plurality of permanent magnets. An electrical voltage is induced in coils 45 by the rotation of the rotor 44. The coils 45 are provided on a printed circuit board 46 and, for example, printed onto this printed circuit board 46. The voltage which is induced in the coil 45 is then transmitted to a power or energy management module 47 by means of conductor tracks on the printed circuit board 46. The energy management module 47 then makes available a suitable electrical power supply to a transmission module 48, taking into account prespecified boundary conditions.

Figure 13:
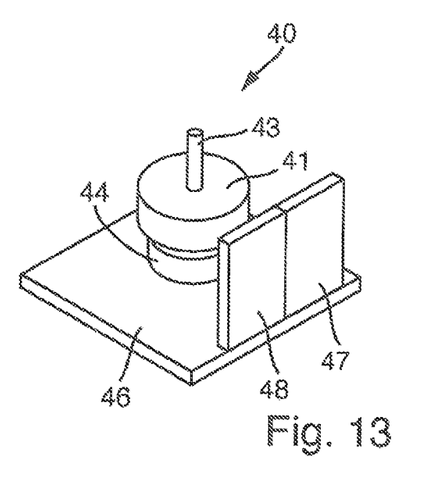
FIG. 13 shows the communication device of FIG. 12 obliquely from above.

The illustration of FIG. 13 shows that the energy management module 47 and the transmission module 48 are inserted into plug connectors, not illustrated, on the printed circuit board 46. As a result, the energy management module 47 can be easily plugged in and additional connection wires are not required since the electrical energy is transmitted by means of conductor tracks on the printed circuit board 46. The transmission module 48 is plugged in in the same way, wherein the transmission module 48 can either be plugged into the energy management module 47 or likewise into a suitable plug connection on the printed circuit board 46, wherein the energy management module 47 then makes available the electrical energy required for operating the transmission module 48 by means of a plug connection on the printed circuit board 46. As has been mentioned, both the coils 45 and also all the circuitry of said coils 45 are printed on the printed circuit board 46. The construction of the communication device 40 according to the invention is considerably simplified as a result and, if necessary, individual modules can be easily replaced by modules with different properties.

Figure 14:
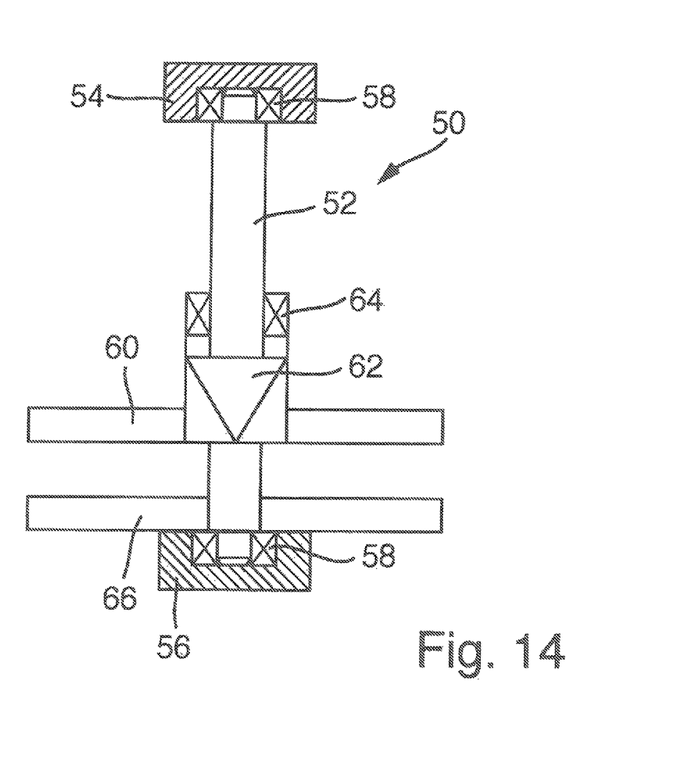
FIG. 14 shows a converter module for a communication device according to the invention in line with a further embodiment of the invention.

The illustration of FIG. 14 schematically shows a converter module 50 for a communication device in line with a further embodiment of the invention. The converter module 50 has a shaft 52 which is mounted on opposite housing walls 54, 56, in each case in ball bearings 58. A rotational movement of the shaft is simplified and friction is reduced as a result. The degree of efficiency of the converter module 50 is increased as a result.

A disk-like rotor 60 comprising a plurality of permanent magnets, not illustrated in FIG. 14, is fixed on the shaft 52, so that the rotor 60 rotates together with the shaft 52. The rotor 60 is provided with a freewheel 62 which has clamping rollers, not illustrated in FIG. 14. The freewheel 62 is arranged on the shaft 52 by means of a further ball bearing 64 and acts on the rotor 60 by means of the clamping rollers. A gear wheel, which is set in rotation by means of a drive rod, see FIGS. 15 to 17 for example, is connected to the freewheel 62, in a manner which is not illustrated, and as a result mounted an the shaft 52 by means of the ball bearing 64. If the gear wheel is then set in rotation, it carries along the rotor 60 by means of the freewheel 62. When the gear wheel stops, the clamping rollers of the freewheel 62 release the rotor 60 and said rotor can rotate yet further.

The disk-like rotor 60 is arranged opposite a coil system 66 which forms a stator of the converter module 50 and is realized, for example, by means of a printed circuit board which is stationary relative to the housing 56. By way of example, a plurality of coils are embedded into a plastic disk, in a manner which is not illustrated.

Both the freewheel 62 comprising clamping rollers and the ball bearings 58, 64 are available as standard components, and therefore both the degree of efficiency of the converter module 50 is improved and also the production costs can be kept low.

Figure 15:
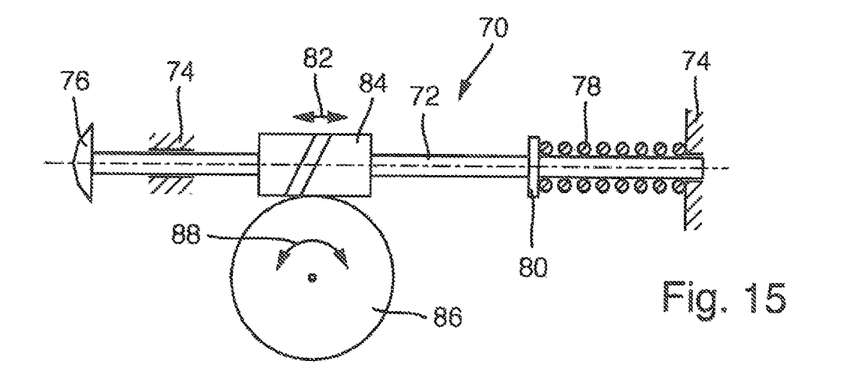
FIG. 15 shows a movement module for a communication device in line with a further embodiment of the invention.

The illustration of FIG. 15 shows a movement module 70 for a communication device according to the invention. A drive rod 72 is mounted in a linearly displaceable manner between two housing walls 74 or bearing blocks. At its end which is on the left-hand side in FIG. 15, the drive rod 72 is provided with a button 76. In the region of its end which is situated opposite the button 76, the drive rod 72 is surrounded by a compression spring 78. The compression spring 78 bears against the housing wall 74 at one end and against a stop disk 80 at the other end, said stop disk being fixed on the drive rod 72. The compression spring 78 prestresses the drive rod 72 in its starting position, illustrated in FIG. 15. Therefore, if the drive rod 72 is moved to the right by a movement of the button 76, the compression spring 78 is compressed. If the button 76 is then released, the compression spring 78 again moves the drive rod 72 back to the starting position illustrated in FIG. 15. A movement of this kind of the drive rod is illustrated by means of a double-headed arrow 82 in FIG. 15.

The drive rod 72 is provided with a worm shaft 84 and therefore has a worm thread on a section of its length. This worm shaft 84 meshes with a gear wheel which is in the form of a worm gear 86. Therefore, if the drive rod 72 is moved to the right starting from the starting position illustrated in FIG. 15, the worm gear 86 will rotate in the clockwise direction due to the engagement with the worm shaft 84. If the button is then released, the drive rod 72 is again moved to the left to the starting position. The worm gear 86 then rotates in the counterclockwise direction. This to and fro movement of the worm gear 86 is symbolized by means of a curved double-headed arrow 88.

The worm gear 86 transmits its rotation energy to a converter module as is illustrated in FIG. 14 for example. In this case, the worm gear 86 would be connected to the freewheel 62 of FIG. 14. In the event of movement of the drive rod 72 in FIG. 15 to the right, the rotor 60 of the converter module 50 is then carried along by means of the freewheel 62. When the drive rod 62 comes to a stop and is then moved back to its starting position again by means of the compression spring 78, the rotor 60 can rotate further and the converter module 50 can therefore continue to generate electrical energy.

It is also possible, in a manner not illustrated, to combine the freewheel 62, for example, with a shiftable gear mechanism, so that rotation of the worm gear 86 both in the clockwise direction and also in the counterclockwise direction always leads to rotation of the rotor 60 of the converter module 50 in the same direction. The force of the compression spring 78 can then also be used for generating electrical energy.

Figure 16:
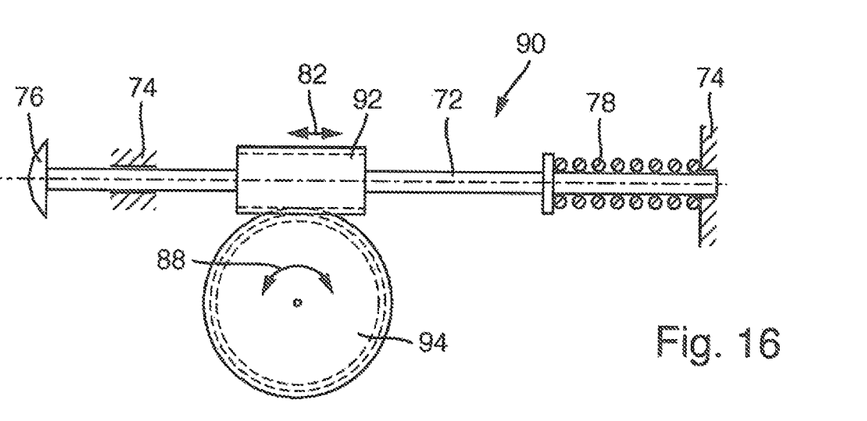
FIG. 16 shows a movement module for a communication device in line with a further embodiment of the invention.

The illustration of FIG. 16 shows a movement module 90 for a communication device in line with a further embodiment of the invention. In this case, only those elements which differ from the movement module 70 of FIG. 15 are explained with reference to the movement module 90.

In principle, the manner of operation of the movement module 90 of FIG. 16 is identical to the manner of operation of the movement module 70 of FIG. 15. A movement of the drive rod 72 in the directions of the double-headed arrow 82 leads to a movement of the gear wheel in the directions of the curved double-headed arrow 88. In contrast to the converter module 70 of FIG. 15, the drive rod 72 is provided with a screw thread 92 on a section of its length. This screw thread 92 meshes with a gear wheel 94. The gear wheel 94 preferably has a spur toothing system. The screw thread 92 can be produced in a cost-effective manner, for example is also available as a standard part. The spur-toothed gear wheel 94 is also available as a standard part. Both the screw thread 92 and also the spur-toothed gear wheel 94 can otherwise also be produced in a cost-effective manner. The kinematic pairing between the screw thread 92 and the spur-toothed gear wheel 94 is not optimal, but coupling between the screw thread 92 and the gear wheel 94 can be adapted, so that these two elements can make contact at an angle of 90°. The pitch of the screw thread 92 has to be matched to the intermediate tooth space and the tooth width of the gear wheel 94. Once the matching is performed, however, manufacture can be performed in a cost-effective manner. Non-optimal kinematic pairing between the screw thread 92 and the gear wheel 94 can be accepted for the purposes of the communication device according to the invention.

Improvement of the kinematic pairing between the screw thread 92 and the gear wheel 94 is possible by forming the gear wheel 94 with a helical toothing system.

Figure 17:
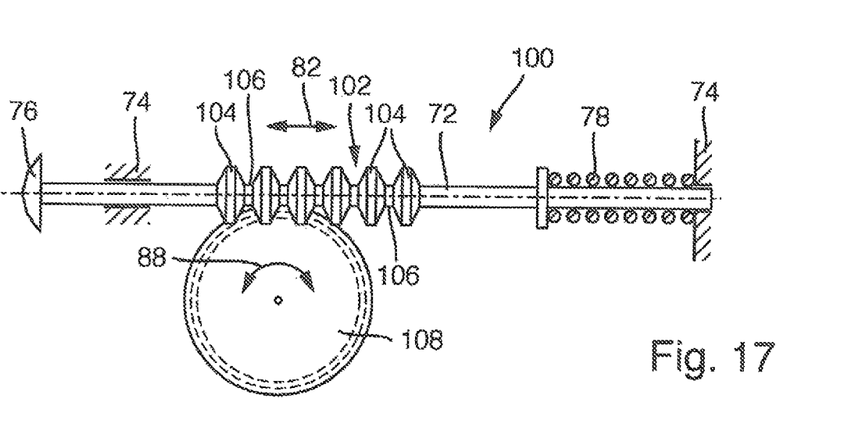
FIG. 17 shows a movement module for a communication device in line with a further embodiment of the invention.

The illustration of FIG. 17 shows a movement module 100 for a communication device according to the invention in line with a further embodiment. The manner of operation of the movement module 100 of FIG. 17 is identical to the manner of operation of the movement modules 70, 90 already explained with reference to FIGS. 15 and 16, and therefore only the different elements will be explained.

In the movement module 100, the drive rod 72 is provided with a circumferential toothing system 102 on a section of its length. As a result, the drive rod 72 has the shape of a round toothed rack on a section of its length. The circumferential toothing system 102 is realized by a plurality of circularly circumferential teeth 104 which are spaced apart from one another and circumferential recesses 106 which are arranged between two teeth 104 in each case being provided. As shown, in FIG. 17, the teeth 104 and the recesses 106, as seen in section, form a conventional toothing system profile. However, this toothing system profile runs around the center longitudinal axis of the drive rod 72.

The toothing system 102 meshes with a gear wheel 108 which is provided with a toothing system which matches the toothing system 102 and is in the form of a spur toothing system. The toothing system 102 and the gear wheel 108 form a correct kinematic pairing. The teeth 104 of the toothing system 102 and the teeth of the gear wheel 108 make contact at one point in each case. Since only low forces have to be transmitted in the movement module 100 of the communication device according to the invention, this point-to-point contact is positive since manufacturing tolerances of the toothing system 102 and of the gear wheel 108 do not negatively influence the kinematic properties of the movement module 100. The circumferential toothing system 102 can be produced, for example, by means of turning, or as an alternative also by means of injection molding, for example. The spur-toothed gear wheel 108 is a standard component, but can also be produced by means of injection molding, for example.

Therefore, the movement module 100 is extremely functionally reliable and can be produced in a cost-effective manner at the same time.

The invention claimed is:

1. A communication device, comprising
    a device, which is in the form of a movement module, for mechanically generating a rotational movement, wherein the movement module is provided with a drive rod and a pushbutton for generating a linear movement of the drive rod and also with at least one gear wheel which acts on the drive rod and, in the event of a linear movement of the drive rod, is set in rotational motion,
    a converter module which is connected to the movement module, wherein the converter module converts the rotational movement which is generated in the movement module into electrical energy,
    an energy management module, which is connected to the converter module, for providing electrical energy in line with prespecified boundary conditions based on the electrical energy which is provided by the converter module, and
    a transmission module for transmitting information,
    wherein the drive rod is rotationally fixed and, at least in sections, is provided with a toothing system, each tooth being in the form of a circularly circumferential non-helical tooth, each tooth further being separated by a non-helical adjacent circumferential recess from adjacent teeth.

2. The communication device as claimed in claim 1, characterized in that the gear wheel has a spur toothing system.

3. The communication device as claimed in claim 1, characterized in that a spring is provided in order to prestress the pushbutton and/or the drive rod in a starting position.

4. The communication device as claimed in claim 1, wherein the at least one gear wheel of the movement module is connected to a non-return device and a freewheel.

5. The communication device as claimed in claim 1, wherein the movement module has a shiftable gear mechanism in order to convert a movement of the drive rod in opposite directions into a rotational movement with the same direction of rotation.

6. A power supply module for the communication device as claimed in claim 1, comprising
- a device, which is in the form of the movement module, for mechanically generating the rotational movement, and
- the converter module for converting the rotation energy of the rotational movement into the electrical energy.

7. The power supply module as claimed in claim 6, wherein the converter module has a rotor comprising at least one permanent magnet and has a stator which is separated from the rotor by an air gap and comprises at least one coil.

* * * * *